(12) United States Patent
Klug et al.

(10) Patent No.: US 7,240,134 B2
(45) Date of Patent: Jul. 3, 2007

(54) CIRCUIT WITH PROCESSING PREVENTION UNIT

(75) Inventors: Franz Klug, Munich (DE); Thomas Kunemund, Munich (DE); Steffen Marc Sonnekalb, Taufkirchen (DE)

(73) Assignee: Infineon Technologies AG (DE)

( * ) Notice: Subject to any disclaimer, the term of this patent is extended or adjusted under 35 U.S.C. 154(b) by 254 days.

(21) Appl. No.: 10/958,182

(22) Filed: Oct. 4, 2004

(65) Prior Publication Data

US 2005/0097250 A1 May 5, 2005

(30) Foreign Application Priority Data

Oct. 8, 2003 (DE) ............................... 103 47 301

(51) Int. Cl.
*H04L 12/40* (2006.01)
*H04L 29/06* (2006.01)
*G06F 13/00* (2006.01)
*G06F 1/28* (2006.01)
*G01R 31/08* (2006.01)

(52) U.S. Cl. ..................................... 710/107; 710/106
(58) Field of Classification Search ................. 710/106, 710/107, 100, 305, 313, 2, 51; 340/825.52; 375/146; 326/21; 370/282, 464, 916; 714/1, 714/4; 361/679, 683, 686
See application file for complete search history.

(56) References Cited

U.S. PATENT DOCUMENTS

| | | | | |
|---|---|---|---|---|
| 4,901,348 A | * | 2/1990 | Nichols et al. ............... | 726/13 |
| 5,659,689 A | * | 8/1997 | Sarangdhar et al. ........ | 710/305 |
| 5,696,911 A | * | 12/1997 | Fredriksson ................. | 710/106 |
| 5,784,579 A | * | 7/1998 | Pawlowski et al. ......... | 710/106 |
| 5,929,896 A | * | 7/1999 | Goodman et al. ....... | 348/14.12 |
| 6,785,758 B1 | * | 8/2004 | Kotlowski et al. .......... | 710/305 |
| 2005/0097250 A1 | * | 5/2005 | Klug et al. .................. | 710/107 |
| 2005/0249020 A1 | * | 11/2005 | Kim et al. ............. | 365/230.05 |
| 2006/0055524 A1 | * | 3/2006 | Okubo ........................ | 340/445 |

FOREIGN PATENT DOCUMENTS

| | | |
|---|---|---|
| DE | 199 11 673 A1 | 9/2000 |
| DE | 199 11 673 A1 | 9/2000 |
| EP | 0 393 569 A2 | 10/1990 |
| EP | 0 393 569 A3 | 10/1990 |
| FR | 2 584 514 A1 | 1/1987 |
| WO | WO-02/21241 A2 | 3/2002 |
| WO | WO-02/21241 A3 | 3/2002 |

OTHER PUBLICATIONS

"Distributed data acquisition system for substation bus protection and monitoring" by S.D.Barrick (abstract only) Publication Date: Sep. 15-17, 1998.*
Benini, L. et al.; "Energy-Aware Design Techniques for Differential Power Analysis Protection"; DAC 2003, Jun. 2-6, 2003, Anaheim, California, USA.; pp. 36-41.

* cited by examiner

*Primary Examiner*—Gopal C. Ray
(74) *Attorney, Agent, or Firm*—Dickstein, Shapiro, LLP.

(57) ABSTRACT

Circuit having a bus, a first receiver circuit part coupled to the bus for processing a signal on the bus, a second receiver circuit part coupled to the bus for processing a signal on the bus, a transmitter circuit part coupled to the bus for outputting a signal on the bus, and a unit for preventing processing a signal on the bus by the first receiver circuit part in response to a control signal.

16 Claims, 4 Drawing Sheets

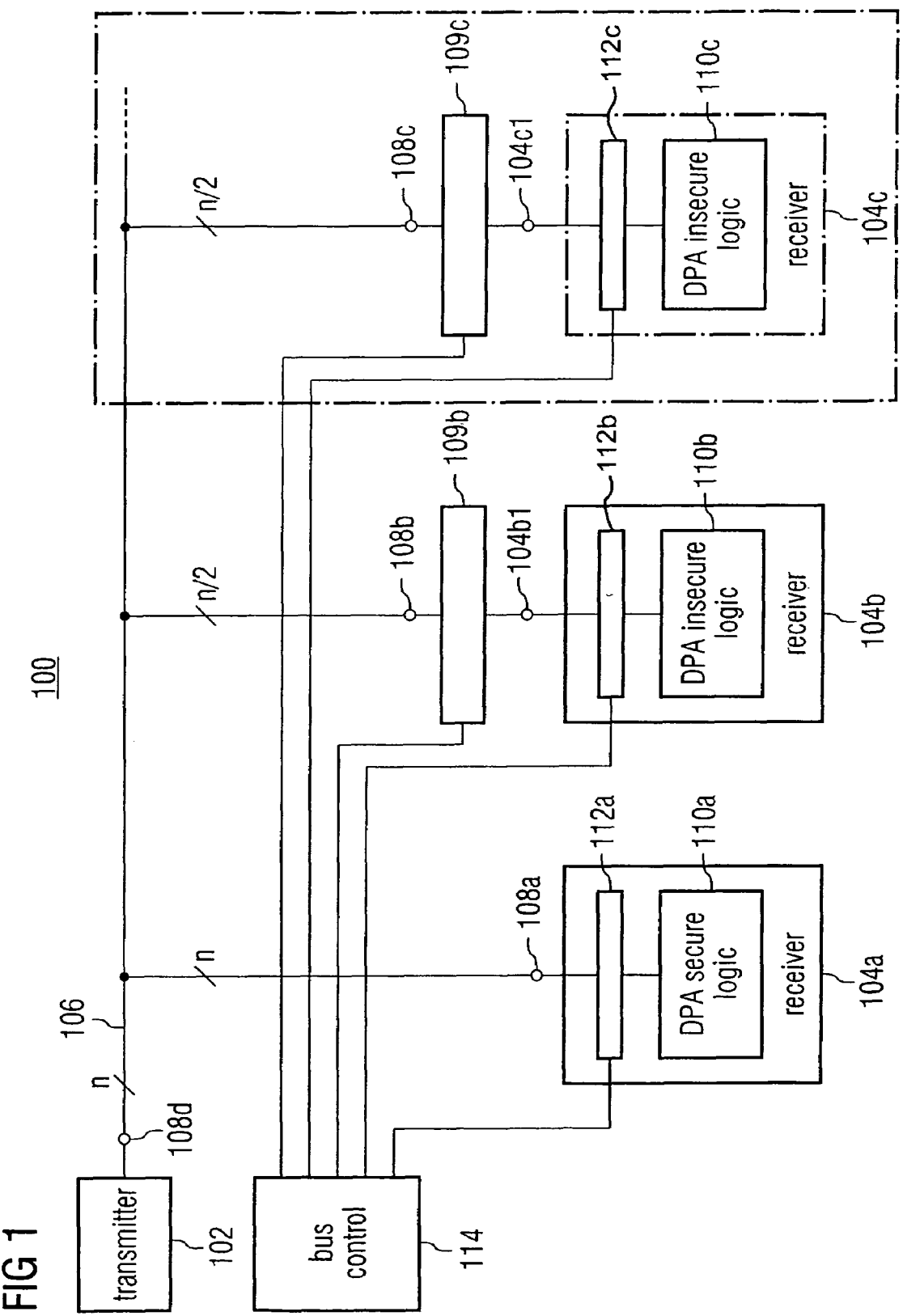

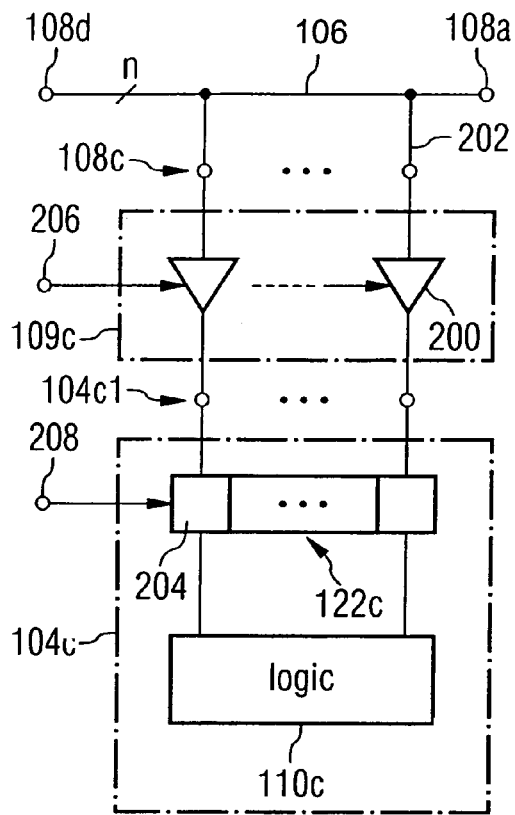
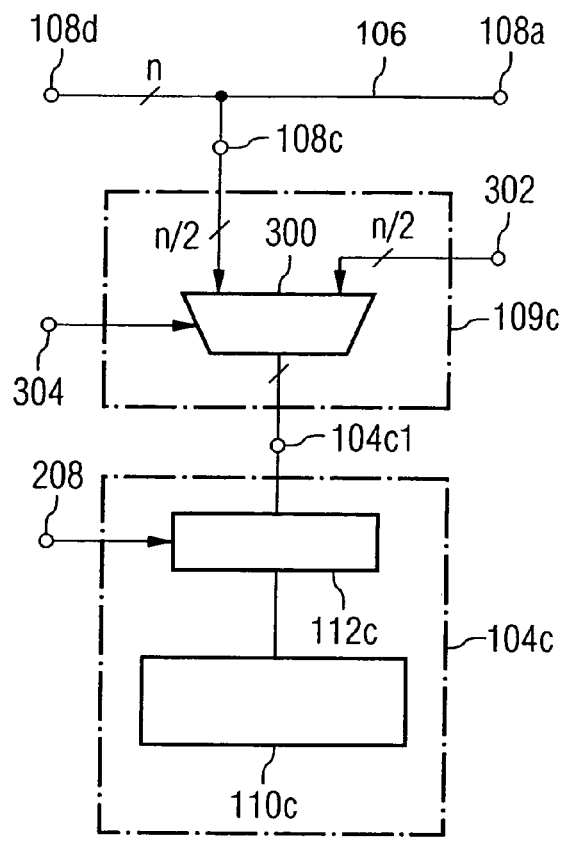
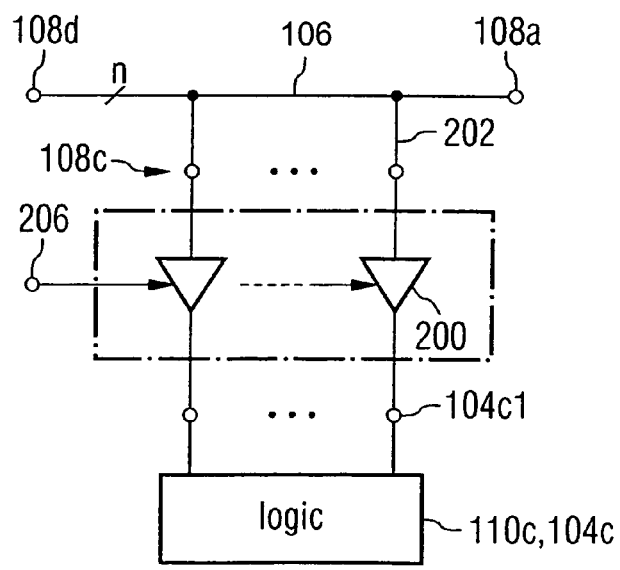

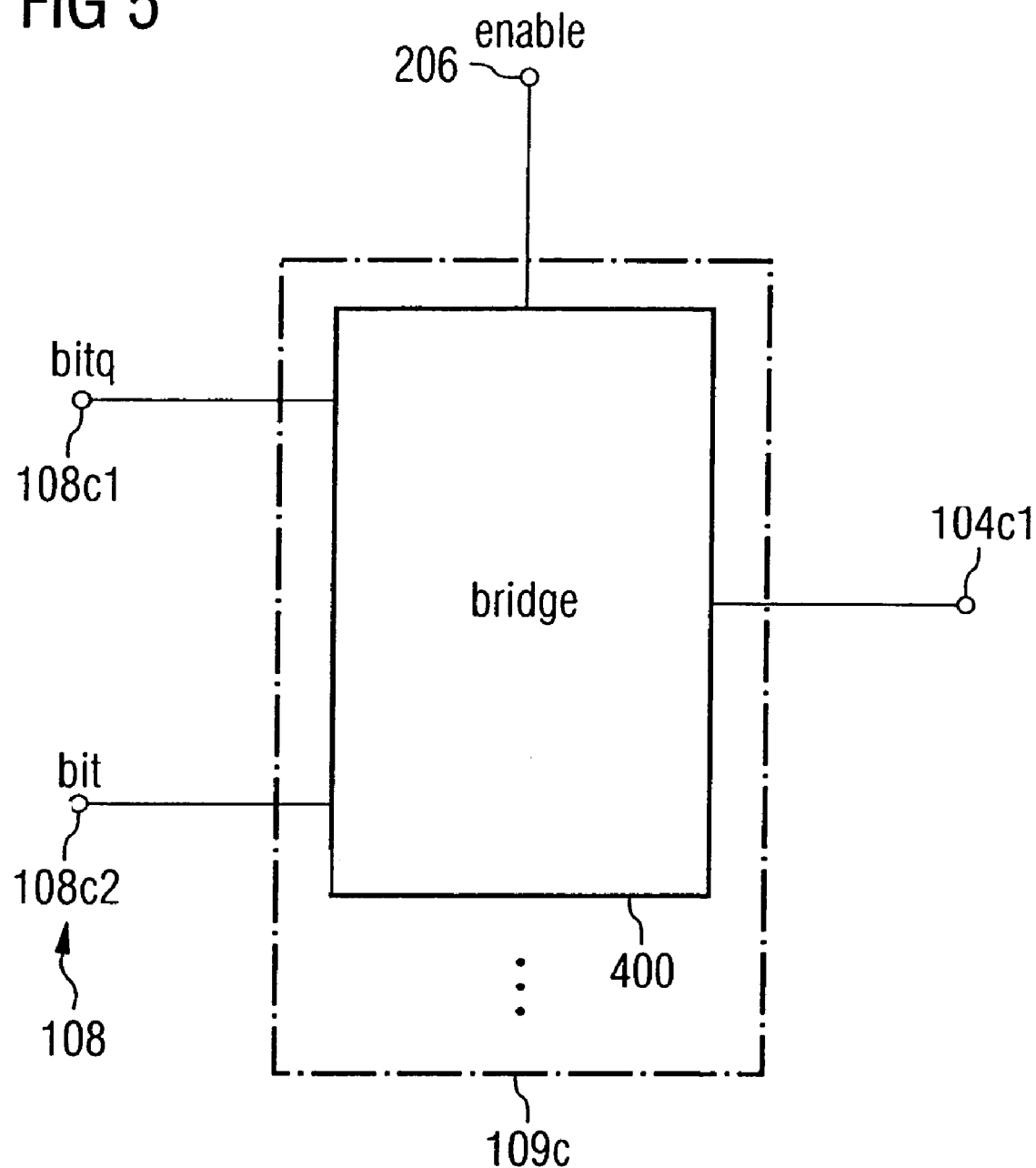

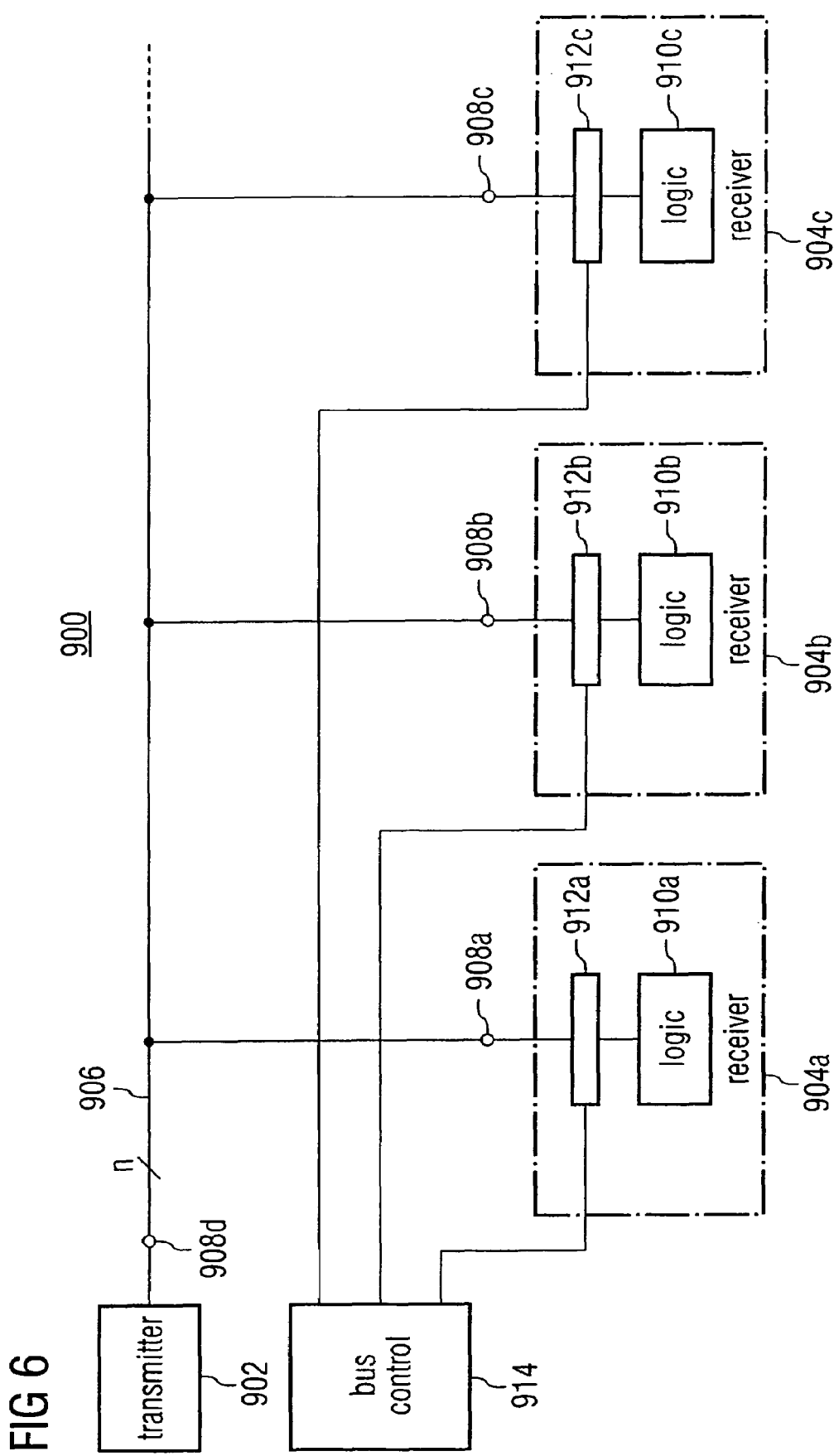

CIRCUIT WITH PROCESSING PREVENTION UNIT

CROSS-REFERENCE TO RELATED APPLICATION

This application claims priority from German Patent Application No. 10347301.7, which was filed on Oct. 8, 2003 and is incorporated herein by reference in its entirety.

BACKGROUND OF THE INVENTION

1. Field of the Invention

The present invention relates generally to bus systems and circuits with a bus, respectively, more specifically to circuits with a bus with several receivers and particularly to bus systems where at least, among other things, secret data, such as amounts of money, cryptographic keys or the like are transmitted on the bus, such as it is the case, for example, with cryptocontrollers in chip cards or smart cards.

2. Description of the Related Art

One example for a possible bus system and a circuit with a bus, respectively, is shown in FIG. 6. The circuit, generally indicated by 900, comprises a transmitter circuit part 902 and three receiver circuit parts 904a, 904b and 904c. Every circuit part 902 and 904a-904c, respectively, comprises an n-bit data input. Every circuit part 902, 904a-904 is coupled to bus 906 via its data input. Particularly, the receiver circuit part 904a is connected to an n-bit terminal 908a, the receiver circuit part 904b is connected to an n-bit terminal 908b, the receiver circuit part 904c is connected to an n-bit terminal 908c and the transmitter circuit part 902 is connected to a n-bit bus terminal 908d of the bus 906. Every receiver circuit part 904a-904c comprises a logic 910a, 910b and 910c, respectively, whose n-bit data input is connected via an n-bit input register 912a, 912b and 912c, respectively, to the respective data input of the receiver circuit part 904a-904c and the bus terminal 908a-908c, respectively. Every register 912a-912c has an enable and a toggle input, respectively, which is connected to a bus control 914.

In the exemplary bus system 900 of FIG. 6, the transmitter circuit part 902 outputs a data representing signal unspecifically on the bus 906. The signal reaches every bus terminal, particularly every bus terminal 908a-908c of the receiver circuit parts 904a-904c. From there, the signal reaches the input registers 912a-912c of the individual receiver circuit parts 904a-904c unhindered, to be latched and entered there, respectively. In the next clock cycle, the bus control 914 provides that among the input registers 912a-912c only those output their register content to the subsequent logic 910a-910c, which belong to the receiver circuit part 904a, 904c, which is the addressee of the signal output by the transmitter 902 on the bus 906. Therefore, the bus control 914 transmits the enable and toggle signal, respectively, to the input register and the input registers, respectively, of the addressee and the addressee circuit parts, respectively.

A bus system as the one of FIG. 6 cannot simply be used when both non security critical and security critical data are transmitted via the bus 906. In cryptography, for example, data that can be used for a DPA (differential power analysis) attack is processed in chip cards, smart cards or the same. In DPA attacks, the fact is utilized that processing a signal in a circuit influences the current consumption of the circuit, i.e. that the current consumption correlates with the input data. In DPA attacks, several different data are fed subsequently to the circuit, such as the cryptocontroller of a chip card, which processes the same then in the same way and, for example, with the same cryptokey. The current consumption curve of the circuit is measured each time. With regard to the measurement results, the correctness of a hypothesis for secure data, such as the cryptokey for an encryption implemented by the circuit, is checked by using a statistical analysis of the current and power consumption, respectively.

In the circuit 900 of FIG. 6, it is the case that all data output on the bus 906 is definitely first stored once in the input registers 912a-912c. These latching processes show in the current and power consumption, respectively, of the circuit 900 by overlaying, for example due to the switching processes in utilized transistors from the D flip flops underlying the registers. If the circuit 900 processes a different input value fed by the attacker, the signals and data, respectively, output on the bus 906 change during the processing by the circuit 900. When no counter measures are taken in the bus system 900 of FIG. 6, a DPA attack is successful, even when the logics 910a-910c are themselves embodied DPA secure.

One possibility for warding off DPA attacks is the usage of a dual rail precharge logic and bus. In these logics, every bit is transmitted on two bit lines. The bit value 0 corresponds to a logical 1 on the one and a logical 0 on the other bit line and rail, respectively, while the bit value 0 corresponds to the inverted distribution, i.e. a logic 0 on the one and a logic 1 on the other rail. Thus, consequently, a bit change always leads to a change from logic high to logic low and vice versa. Correspondingly, registers in the dual rail logic comprise twice as many cells and flip flops, respectively, as usually, i.e. 2n cells for an n-bit value, and the bus is twice as wide, 2n-bit wide. When they latch a small n-bit value, half of all register cells have always a logic low state and the other half a logic high state. In order to take away the possibility from the attacker to ascertain which bits change between subsequent n-bit values stored in the register, a precharge is performed prior to every register entry, where all register lines are brought to a logic low or a logic high state. Consequently, in every register entry, always n register cell state changes take place.

As has already been mentioned, it is not sufficient to perform those logics DPA secure in dual rail precharge logic in the circuit 900, which subject the security critical data, which could be used for a DPA attack, to the actual operations. Rather, the data is already "processed" earlier in the input registers 912a-912c. One possibility to implement the circuit 900 DPA secure is to embody all input registers 912a-912c DPA secure in dual rail precharge logic at the input stages of the receiver circuit parts 904a-904c. One disadvantage of this solution is, however, that there is a significant overhead of area, development time and current consumption. As has already been mentioned, twice the number of register lines would have to be used for the input registers. Additionally, a precharge cycle would have to be performed prior to every register entry, i.e. prior to every data output on the bus 906, which means additional current consumption.

SUMMARY OF THE INVENTION

It is an object of the present invention to provide a circuit with a bus and two receiver circuit parts and a method for controlling the same, respectively, which is less expensive in terms of hardware and/or has a lower current consumption with the same or even higher security against DPA attacks.

In accordance with a fist aspect, the present invention provides a circuit, having: a bus; a first receiver circuit part coupled to the bus for processing a signal on the bus; a second receiver circuit part coupled to the bus for processing a signal on the bus; a transmitter circuit part coupled to the bus for outputting a signal on the bus; and a means for preventing processing a signal on the bus by the first receiver circuit part in response to a control signal.

In accordance with a second aspect, the present invention provides a method for controlling a circuit with a bus, a first receiver circuit part coupled to the bus for processing a signal on the bus, a second receiver circuit part coupled to the bus for processing a signal on the bus and a receiver circuit part coupled to the bus for outputting a signal on the bus, wherein the method comprises: a means for preventing processing a signal on the bus by the first receiver circuit part in response to a control signal.

In accordance with a third aspect, the present invention provides a computer program with program code for performing a method for controlling a circuit with a bus, a first receiver circuit part coupled to the bus for processing a signal on the bus, a second receiver circuit part coupled to the bus for processing a signal on the bus and a receiver circuit part coupled to the bus for outputting a signal on the bus, wherein the method comprises: a means for preventing processing a signal on the bus by the first receiver circuit part in response to a control signal, when the computer program runs on a computer.

It is the knowledge of the present invention that the conventional procedure with busses with several receivers, namely to supply a signal output on the bus first to all receivers and not only to the addressees, has to be given up, since processing the signal begins already with the entry of the signal at the input registers or latches of the receiver circuit parts and thus already provides possibilities for potential attackers to spy out the circuit.

It was another realization of the present invention, to realize that the overhead in connection with preventing processing of a signal on the bus by a non-addressed receiver circuit part is compensated in the overall consideration by the fact that this receiver circuit part does have to be embodied non or less DPA secure when it is not provided for processing security critical data and data with a higher secrecy stage than a predetermined threshold, respectively. Security critical data can be the one which enables a DPA attack when it is processed in DPA unsecure logic and shows itself correlatively in the current consumption, respectively, but also different ones, particularly plaintext data, such as money amounts, account numbers, identification numbers, etc.

Thus, it is an advantage of the present invention that based thereon a circuit can be obtained with a bus and two or more receivers, which shows less current consumption with at least the same DPA security, since processing the data on the bus by the receiver circuit parts can be prevented, do not have to be embodied DPA secure, as long as the same are not provided for processing security critical data, i.e. are never receivers of security critical data according to the circuit.

It is another advantage of the present invention that a circuit with less hardware effort can be obtained with the same or even higher DPA security, since those receiver circuit parts, where processing of the signal on the bus can be prevented, can be implemented easier, as long as they are not provided for processing security critical data.

It is another advantage of the present invention that the same can provide a higher degree of DPA security, when a security critical datum is not transmitted on the bus to a non DPA secure receiver circuit part.

It is another advantage of the present invention that the same enables a lower current consumption, because the receiver circuit part, which is prevented from processing the signal on the bus, does not consume any current in the cases of prevention, not even by a possibly present input and receiving register, respectively.

According to an embodiment of the present invention, it is intended for preventing the processing of the signal on the bus by a respective receiver circuit part that an otherwise existing electrical continuity between the bus and the receiver circuit part is interrupted, so that in the case of the prevention the signal does not reach the receiver circuit part, neither in the electrical sense nor in the content sense, which means by a signal corresponding to the signal since it indicates the same value. For example, a means is connected between bus terminal and receiver circuit part, to conduct current between bus and receiver circuit part in the case of no prevention and when no control signal is present, respectively, and to prevent the current flow between bus and receiver circuit part in the case of prevention and presence of a control signal, respectively. For example, a tristate buffer and a tristate buffer logic, respectively, or a tristate transistor could be used therefore. Alternatively, for example, a multiplexer could be used, which toggles between the signal on the bus and an insignificant, maybe random or constant but security uncritical datum, wherein the multiplexer in this case is preferably formed as analog multiplexer/demultiplexer.

According to an alternative embodiment of the present invention it is intended that for preventing the processing by a respective receiver circuit part the same is separated from a supply voltage.

BRIEF DESCRIPTION OF THE DRAWINGS

These and other objects and features of the present invention will become clear from the following description taken in conjunction with the accompanying drawings, in which:

FIG. 1 is a block diagram of a circuit according to an embodiment of the present invention;

FIG. 2 is a block diagram of a portion of the circuit of FIG. 1 for illustrating an embodiment for an implementation of the means for preventing processing;

FIG. 3 is a block diagram of a portion of the circuit of FIG. 1 for illustrating a further embodiment for implementing the means for preventing processing;

FIG. 4 is a block diagram illustrating a receiver circuit part detached to a bus, according to a further embodiment of the present invention;

FIG. 5 is a block diagram of portions of the circuit part of FIG. 2 for illustrating an alternative embodiment for implementing the means for preventing processing; and FIG. 6 is a block diagram of a conventional bus system.

DESCRIPTION OF THE PREFERRED EMBODIMENTS

Before embodiments of the present invention will be discussed below in more detail with reference to FIGS. 1 to 5, it should be noted that the same elements in these figures are provided with same or similar reference numbers and that a repeated description of these elements is omitted.

FIG. 1 shows a circuit 100 according to an embodiment of the present invention. The circuit 100 illustrated in FIG. 1 could, for example, be part of a cryptocontroller for a chip card or smart card. The circuit 100 comprises a transmitter circuit part 102 and three receiver circuit parts 104a, 104b and 104c. The receiver circuit parts 104a, 104b and 104c as well as the transmitter circuit part 102 are coupled to a bus 106 and are hooked to the bus, respectively. More specifically, the bus 100 comprises at least four bus terminals 108a, 108b, 108c and 108d, wherein the bus 106 can also have further bus terminals in a part of the circuit 100 not shown in FIG. 1. The receiver circuit part 104a is directly connected to the bus terminal 108a. The receiver circuit part 104b is connected to the bus terminal 108b via a processing prevention means 109b, which is connected between the bus terminal 108b and the data input 104b1 of the receiver circuit part 104b. Similarly, the receiver circuit part 104c is not connected directly to the bus terminal 108c but via a processing prevention means 109c, which is connected between the bus terminal 108c and a data input 104c1 of the receiver circuit part 104c.

Every receiver circuit part 104a-104c comprises a logic 110a, 110b and 110c as well as a receiver and input register 112a, 112b and 112c, respectively, as an input stage.

Every register 112a-112c comprises a register input and a register output as well as a register control input. The register input of every input register 112a-112c forms at the same time the data input of the respective receiver circuit part 104a-104c. The register output is connected to the respective downstream logic 110a-110c. The register control input is connected to a bus control 114, to obtain enable and toggle signals, respectively, from the same, which indicate that the respective input register is to output its register input to the downstream logic, as will be discussed below in more detail.

Apart from a data input and a data output, by which the processing prevention means 109b and 109c are connected between bus terminal and data input, the same comprise further a control input, which is also connected to the bus control 114 to obtain a control signal from the same, which indicates to the respective processing prevention means that the same is to prevent a signal on the bus 106 from reaching the respective receiver circuit part 104b and 104c, respectively, coupled to the bus 106, as will also be discussed below in more detail.

While the circuit 100 of FIG. 1 can be any electronic circuit, the circuit of FIG. 1 will be discussed below against the background that the same forms part of cryptocontroller, which is, for example, used in a chip card or smart card in order to better illustrate the advantages of the circuit. Thereby, the circuit part 100 illustrated in FIG. 1 can illustrate for example an upper hierarchy level of the microcontroller, wherein, for example, the transmitter 102 represented the CPU, while the receiver circuit parts 104a-104c represented a DES module, a transmitter/receiver module, a memory, a cryptographic module, a random generator or the same. The circuit part 100 illustrated in FIG. 1 can also represent a detail in a lower hierarchy level of the cryptocontroller, wherein, for example, the transmitter circuit part 102 would correspond to a cash memory, the receiver circuit part 104a to an encryption unit, the receiver circuit part 104b to an EEPROM and the receiver circuit part 104c to another circuit part.

For illustration purposes, it is further assumed that security critical data is output on the bus 106, which means in the present embodiment the same can be used for a DPA attack. This means that their processing would show in the current consumption of the circuit 100, and that the same would also allow conclusions about the secret datum and statements about the correctness of a hypothesis about the secret datum, respectively, by correlation between the secret datum, such as a cryptographic key, and the current consumption and power consumption, respectively, of the circuit 100, when the circuit 100 is operated several times with several different input data. Apart from that, security uncritical data is also transmitted on the bus 106, i.e. data whose processing can have an effect on the total current consumption of the circuit 100, since it does not allow any conclusions about a secret datum for an attacker. With reference to the above example, for example, addresses, which are security uncritical, and data, which is security critical, could be transmitted simultaneously on the bus 106. This would, for example, be the case in the case of the cache memory as transmitter circuit part 102 and the EEPROM and a memory encryption unit as receiver circuit parts.

It is further assumed that the bus 106 is a DPA secure bus, i.e. a bus that is implemented in a DPA secure way since security critical data is transmitted on the bus 106. Exemplarily, it is assumed that the bus is implemented as dual rail precharge bus (dual rail with precharge bus). This means that although the bus in FIG. 1 is illustrated as an n-bit wide bus, the same transmits only n/2 bit values, wherein n is an even integer. Alternately, an n-bit useful signal and an n-bit precharge signal are applied to the bus 106, wherein an n-bit useful signal has n/2 logic high and n/2 logic low states and a precharge signal n logic high or n logic low states. With regard to a more detailed description of the dual rail precharge logic, reference is made to the background section.

Further, in the following description, it is assumed that the logic 110a is a DPA secure logic, while the logics 110b and 110c are DPA insecure logics. The DPA secure logic 110a is, for example, embodied in dual rail precharge logic. Accordingly, the register 112a is also embodied DPA secure, while the registers 112b and 112c are implemented in a simple way. More specifically, this means that the input register 112a is an n-bit register, whose n-bit register input is directly connected to the n-bit bus terminal 108a. The input registers 112b and 112c, however, are n/2 bit registers. Every one of the n/2 register cells of these registers comprises a register input, which is associated to a predetermined rail of every pair of rails of the bus 106. More specifically, the bus terminals 108b and 108c are n/2 bit terminals, to which only the predetermined rail of every pair of rails, which represents a logic bit of the n/2 bit wide datum transmitted via the bus 106 is led.

After the structure of the circuit 100 as well as a possible embodiment for the same have been described above, it will be briefly discussed, prior to the description of its mode of operation, what is meant in the present and particularly the following description by "processing a signal". Processing a signal is to define any electronic process where an electric change of state is performed in dependency on the signal and where the current consumption depends on the value of the signal, respectively. Particularly, the term "processing a signal" comprises applying a signal to a control input of the transistor or latching a datum in a register, since switching a transistor in dependency on the signal on the bus leads to current consumption peaks, for example in the CMOS technology. Compared with this, processing a signal is not to define a process where the signal is either passed or not passed, since this is presently merely considered as transmission to a subsequent processing or preventing from a subsequent processing and again in this process the current consumption does not depend on the value of the signal.

When now the transmitter 102 outputs a signal on the bus 106, which has already been preceded by a precharge signal, this signal on the bus 106 is meant for a specific one of the receiver circuit parts 104a-104c, the so called addressee. As has already been described, the signal still reaches all bus terminals 108a-108c of the receiver circuit parts 104a-104c independent of the fact whether the respective circuit part is receiver or not. Thus, the bus 106 forms an electrical continuity, due to which the signal can propagate on the bus to all bus terminals and from there to the input register 112a and the processing prevention means 109b, 109c, respectively.

Four cases can be distinguished:
1. The signal on the bus 106 is a security critical datum, i.e. it enables a DPA attack when it is processed DPA insecurely and addressee is a DPA secure logic, i.e. receiver circuit part 104a.
2. The signal on the bus concerns a DPA uncritical datum, which enables no DPA attack with DPA insecure processing, and the addressee is a DPA secure logic, i.e. receiver circuit part 104a.
3. The datum is a security uncritical datum and receiver is a DPA insecure logic, i.e. receiver circuit part 104b or receiver circuit part 104c.
4. The signal on the bus concerns a security critical datum and the addressee is a DPA insecure logic, i.e. receiver circuit part 104b or 104c.

In the fourth case, it is assumed that this case has already been precluded during the design of the circuit 100 and the cryptocontroller, respectively, into which the same is integrated, and thus will not occur and is prevented, respectively. Thus, in the following, only the three other cases will be discussed.

First, reference is made to case 3, i.e. the signal on the bus 106 represents a security uncritical datum. Addressee is the receiver circuit part 104b. Attention is turned first to the arrival of the signal at the bus terminal 108a. The receiver circuit part 104a directly connected with the same is DPA secure, but not addressee. Since the receiver circuit part 104a is connected directly to the bus 100 and an electrical continuity between transmitter 102 and the register input of the input register 112a exists, the signal and the security uncritical datum, respectively, is directly latched in the input register 112a reset by the previous precharge cycle. This processing of the security uncritical datum by latching is shown as overlaying in the total current consumption of the circuit 100 and the cryptocontroller, respectively, but does not help the DPA attacker to succeed, since the datum is security uncritical. The bus control 114 sends no enable and toggle signal, respectively, to the register control input of the input register 112a, to move the register cells of the input register 112a, for example embodied as flip flops, for passing on the stored signal and security uncritical datum, respectively, to the downstream DPA secure logic 110a, since the receiver circuit part 104a is not the addressee of the signal.

The security uncritical datum reaches also the bus terminal 108c, i.e. a bus terminal which is also associated to a receiver circuit part 104c, which is no addressee of the signal. Since the signal is security uncritical, there is no necessity to prevent the signal from passing on to the register 112c, where the same would be latched but not passed on, as described with reference to the input register 112. Still, according to the present embodiment, the bus control 114 transmits a signal to the control input of the processing prevention means 109c, which indicates that the same is to prevent the signal from reaching the data input 104c1 of the receiver circuit part 104c on the bus 106, and that the same is to interrupt the electrical continuity between bus terminal 108c and data input 104c1, respectively. The advantage herein is that due to this procedure the signal on the bus 106, which is not intended for the receiver circuit part 104c, does not lead to current consuming switching processes in the input register 112c, whereby current saving is achieved. Effectively, the receiver circuit part 104c is thereby separated and "disconnected", respectively, from the bus 106.

The signal 106 reaches also the bus terminal 108b, to which the addressee 104b is coupled. The bus control 114 transmits no control signal to the processing prevention means 109b, which indicated the same to not let the signal pass. Since no control signal comes from the bus control 114, the processing prevention means 109b establishes an electrical continuity between the bus terminal 108b and the data input 104b1 and routes the signal electrically from the bus 106 to the receiver circuit part 104b. There, the signal reaches the input register 112b, where it is latched. Now, the bus control 114 sends the enable and toggle signal, respectively, to the input register 112b of the addressee, so that the same passes the received signal and the received datum, respectively, on to the downstream logic. In that case, this is the receiving register 112b. The DPA insecure logic 110b performs now a predetermined operation with regard to the security uncritical datum, such as a memory operation, a reading operation, a calculating operation or the same, and outputs the result to an appropriate receiver, wherein the return of the signal can also be over the bus 106, wherein this is not illustrated in FIG. 1 for clarity reasons. The performance of the operation at the security uncritical datum by the DPA insecure logic 110b is secure, since the datum is security uncritical and thus provides by definition no DPA useable information to a DPA attacker.

In the following, the second case of the above list will be considered. According to that, the signal on the bus 106 represents a security uncritical datum, wherein the addressee is DPA secure, i.e. the receiver circuit part 104a. In that case, the bus control 114 sends control signals to both the control input of the processing prevention means 109b and the processing prevention means 109c for current saving purposes. Consequently, the signal on the bus reaches the bus terminals 108b and 108c, but from there not any further to the data inputs 104b1 and 104c1 of the unaddressed receiver circuit parts 104b and 104c. Since the DPA secure receiver circuit part 104a is connected directly to the bus terminal 108a, the signal reaches easily the input register 112a, where it is latched. Since the input register 112a is the input register of the addressee, the bus control 114 sends the enable signal to this input register, whereupon the input register 112a passes the signal and the security uncritical datum represented by the same, respectively, on to the DPA secure logic 110a, which performs a predetermined operation on the same in a DPA secure way.

The case mentioned first in the above list concerns the case that the signal on the bus 106 concerns a security critical datum and that the addressee is also the DPA secure receiver 104a. Without the processing prevention means 109b and 109c, this signal would reach easily the data inputs of the receiver circuit parts 104b and 104c in electrical continuity, where the same would be latched in the input registers 112b and 112c, which would allow a DPA attack, as described above, since the registers 112a and 112c are implemented DPA insecure and would thus influence the DPA evaluated current consumption of the circuit 100 in dependency on the signal, and these influences again allow examination of a hypothesis about a secret with different overall input data of the circuit 100. Therefore, in that case, the bus control 114 controls both processing preventions means 109b and 109c with a control signal, which indicates them that the same are to prevent processing by their associated receiver circuit parts 104*b* and 104*c*. Consequently, there is no processing in the unaddressed receiver circuit parts 104*b* and 104*c*. Since the processing prevention means 109*b* and 109*c*, as mentioned above and as will be described in more detail below, also perform no processing of the security critical data, but merely interrupt the electrical continuity between bus terminals 108*b* and 108*c*, respectively, and 104*b*1 and 104*c*1 in a way independent of the signal value, the signal leads also in the processing prevention means 109*b* and 109*c* not to a DPA useable effect on the total current consumption. In other words, the signal on the bus 106 effects no electrical change of state and switching operation, respectively at any of the processing prevention means 109*b*, 109*c* and the receiver circuit parts 104*b*, 104*c*. Since the receiver circuit part 104*a* is the addressee of the signal on the bus 106, the bus control 114 controls the input register 112*a* with an enable signal, which therefore latches the security critical datum and passes it on to the DPA secure logic 110*a* for performing an operation on the same in a DPA secure way in response to the enable signal.

With reference to the above embodiment, it should be noted that the bus has been described above merely as a unidirectional bus, although the same can of course also be used bidirectionally. The parts which the individual circuit parts 102, 104*a*, 104*b*, 104*c* that have assumed in the above description, can consequently be changed in a subsequent clock cycle, so that, for example, one of the receiver circuit parts could assume the part of the transmitter circuit part, while the transmitter circuit part 102 assumes the part of the receiver circuit part.

Further, the bus control 114 has been illustrated as a separate block. However, it should be noted that the bus control 114 does not necessarily have to represent a separate unit in the physical sense. Rather, signals output from the bus control 114 in FIG. 1 can also be output from the individual circuit parts, such as always the transmitter circuit part. In the unidirectional case, the bus control 114 would be integrated in the transmitter circuit part 102.

Further, it should be noted that the previous description relates merely illustratively to a bus with a transmitter and three receivers. The present invention can of course also be applied to busses with a combination of only one transmitter and two receivers.

With reference to FIG. 2, an embodiment for a processing prevention means will be described below. FIG. 2, for example, represents the part illustrated in FIG. 1 with dash-dotted lines according to a specific implementation according to an embodiment of the present invention.

FIG. 2 shows a portion of the bus 106, which merely illustratively comprises the bus terminals 108*b* and 108*a*. Further, the receiver circuit part 104*c* is shown, which is connected to the bus terminal 108*c* via its data input 104*c*1 via the processing prevention means 109*c*. According to this implementation example, the processing prevention means 109*c* is implemented in the form of a tristate buffer. More specifically, the processing prevention means 109*c* comprises n/2 tristate buffers or transistors 200. Every tristate buffer 200 comprises an input, an output and a control input. The input of every tristate buffer 200 is connected to a different rail 202 of the bus 106 via the bus terminal 108*c*, namely a predetermined rail from a different rail pair of the bus 106. The output of every tristate buffer 200 is connected to a register input of a different one of the n/2 register cells 204 of the input register 112*c*. The control inputs of the tristate buffer 200 are controlled via a common control input 206, which is connected to the bus control 114 (FIG. 1), to possibly obtain the control signal which indicates that the same are to prevent a signal processing by the downstream logic 110*c*. FIG. 2 shows also the common register circuit input for the register circuit inputs of the register cells 204 of the input register 112*c*, which is also connected to the bus control 114 (FIG. 1).

The tristate buffers 200 are, for example, active high tristate buffers, whose switching behavior is described by the following truth table, where 0 indicates a logic low and 1 a logic high state, Z represents a high impedance, c represents the logic state at the common control input 206, x represents the logic state at the data input of a tristate buffer 200 and z means the logic state at the data output of the tristate buffer.

| c | x | z |
|---|---|---|
| 0 | 0 | Z |
| 0 | 1 | Z |
| 1 | 0 | 0 |
| 1 | 1 | 1 |

Alternatively, the device 300 could be embodied as active low tristate buffer whose truth table is obtained from the above table by interchanging ones and zeros in column c.

In other words, Z does not only mean high impedance but also the presence of neither a logic 0 nor a logic 1. In that case, the current flow between input and output of the tristate buffer is interrupted. Accordingly, if the bus control 114 (FIG. 1) sends the control signal c=0 to the tristate buffers 200, the same prevent, as desired, that the signal reaches the downstream receiver circuit part 104*c* on the bus 106. For times where the control signal indicating the processing prevention is not transmitted, c=1 is present, and the signal on the bus passes the tristate device 200 easily in electrical continuity.

FIG. 3 represents a further embodiment for an implementation of the processing prevention means 109*c*. According to the embodiment of FIG. 3, the processing prevention means 109*c* comprises an n/2 bit 2 to 1 multiplexer 300, which comprises a first multiplexer input connected to the bus terminal 108*c*, a second multiplexer input connected to a fake and confusion input 302, respectively, a multiplexer output connected to the data input 104*c*1 and a control input 304 connected to the bus control 114.

The multiplexer 300 is preferably formed as analog multiplexer/demultiplexer. The multiplexer comprises, for example, analog switches and transmission gates, respectively, n/2 of which are connected between the first multiplexer input and the multiplexer output and the other n/2 between the second multiplexer input and the multiplexer output, and selectively either the first half or the second half of the same is set into a conductive state by a 1 of 2 decoder (not shown), while the respectively other ones are set into a non-conductive state. In the case where the bus control 114 sends the control signal to the control input 304, which indicates that a processing by the downstream receiver circuit 104*c* is to be prevented, the multiplexer 300 provides for electrical continuity between fake signal input 302 and the data input 104*c*1.

Either a constant signal, which has no further meaning and is in particular security uncritical in the above-mentioned sense, or a random number generated by a random generator is applied to the fake signal input 302. When the control signal is not present, the multiplexer 300 provides for an electrical continuity between the bus terminal 108*c* and the data input 104*c*1. The presence of the control signal corresponds, for example, to a logic high state at the control input 304, while the absence of the control signal corresponds to a logic low state.

With reference to the above description it should be noted that merely receiver circuit parts, which comprise an input register in the input stage, have been described above. However, the present invention can also be applied in cases where a receiver circuit part does not comprise an input register. This case is illustrated in FIG. 4. It should be noted that the absence of an input register could also be provided in the DPA secure logic 110a, when the receiver circuit part 104a would be receiver at every signal output on the bus 106, or when the constant execution of the operation by the logic 110a would be accepted also in cases where the receiver circuit part 104a is not addressee.

With reference to the embodiment of FIG. 2, it should be noted that there, in the case of a dual rail precharge bus as bus 106, the tristate buffers 200 are controlled via the enable signal at the control input 206 by the bus control 114 in the precharge phases and cycles, respectively, such that they will not pass the precharge signal, where, for example, both rails belonging to a logic bit are set into a logic high state, so that no change of state occurs in the input register 112c. The control of the enable signal in that way, namely also in the precharge phases, increases the effort for the control. Thus, in some applications, it can be more advantageous to use the enable signal only in non precharge and data cycles for controlling the passing and not passing of the signal on the bus 106, respectively, while the same assumes values in the precharge cycles that are uncorrelated and ignorable with regard to the desired passing behavior, respectively. In that case, the tristate buffers 200 of FIG. 2 could be replaced by bridge and dual on single circuits, respectively, as will be described below with reference to FIG. 5.

FIG. 5 shows representatively such a bridge circuit 400 in connected state within the environment of the circuit of FIG. 2, wherein it replaces one of the tristate buffers 200 of FIG. 2. The bridge 400 comprises two rail inputs 108c1 and 108c2, each of which is connected to a different one of two associated bit rails of a n wide bus terminal 108a of the n-bit wide bus 106, a single rail output, which is connected to a bit line of the n/2 bit wide single rail input 104c1 of the connected receiver 104c, and a control input, which is connected to the common control input 206 to receive the signal, which indicates during the data cycles that processing of the datum on the bus 106 is to be prevented and assumes arbitrary values in precharge phases. As it is indicated by points within 109c, a bridge replaces all tristate buffers 200 of FIG. 2.

As described above, it is assumed in the embodiment of FIG. 5, that the enable signal assumes only undefined values at the common control input 206 during the precharge phases. Thus, the bridge 400 has the following switching behavior to ensure also in precharge phases that due to the precharge signal on the rails no undesired revealing change of state results in the subsequent DPA insecure input register 204, which follows the output of the bridge 400:

| value | bit | bitq | enable | out |
|---|---|---|---|---|
| precharge | 1 | 1 | X | old value |
| precharge/1/0 | X | X | 0 | old value |
| 1 | 1 | 0 | 1 | 1 |
| 0 | 0 | 1 | 1 | 0 |

In the left column, the table shows the value transferred on the two rail lines connected to the inputs 108c1 and 108c2 of the bridge 400, which is determined by the logic state bitq on the rail 108c1 and the logic state bit on the rail 108c2. A capital X in the table means that the logic state of the respective line is irrelevant and can assume a logic high or logic low state, respectively, and still the other values in the same row apply. The second column indicates the logic state bit, which is assumed on the rail 108c2. The third column shows the logic state bitq, which is assumed on the rail 108c1. The fourth column shows which state the enable signal assumes, which is assumed at the control input 206, wherein the state is indicated by enable. The last column shows which state is assumed at the terminal 104c1, wherein this state is indicated by Out.

As can be seen, the bridge 400 behaves such that when a precharge signal is transmitted on the rails 108c1 and 108c2, i.e. a precharge cycle is present, independent of the state of the enable signal, which is anyway undefined in this cycle, as described above, the state is frozen at the output of the bridge 400 and remains on the old value. Therefore, the downstream input register 204 does not change its state but receives an unchanged signal from the bridge 400. If the enable signal is switched to a logic low state, namely 0, the bridge 400 provides in any case, namely independent of the states on the rails 108c1 and 108c2 that the value at the output 104c1 of the bridge circuit 400 remains unchanged, whereby the downstream input register again does not change its value. This behavior of the bridge 400 allows to carry out the blocking and prevention, respectively, of processing the signal on the bus 106 described in the above embodiments in the data cycles of the bus 106.

If a bit value and not a precharge signal is present on the rails 108c1 and 108c2, respectively, namely a logic 1 or a logic 0, wherein in the first case the rail 108c2 has a logic high state (bit=1), while the rail 108c1 has the logic low state (bitq=0), and wherein in the second case the rail 108c2 has a logic low state (bit=0) and the rail 108c1 has a logic high state (bitq=1), and the enable signal enable has at the same time a logic high state, a respective bit value is simply output at the data output of the bridge 400, whereby the respective state of the downstream register 204 either changes or does not change depending on which value has been stored therein before. As has been described above, this allows the data cycles to pass a signal on the bus 106 to the input register and to allow processing by the receiver 104c, respectively.

As results from the above description, the bridge 400 acts therefore like a latch, which, however, does not change its value in the case that the enable signal has a logic low state and thus signals that the signal is not to be passed on the bus 106. Above that, it does not change its stored state when a precharge cycle is present, independent of the possibly undefined enable signal in these cycles.

An implementation of the bridge 400 could, for example comprise a latch with an input and an output. A first tristate buffer would be connected between input of the latch and the data input 108c2, whose control input is connected to the control input 206. Further, a further tristate buffer would be connected between input 108c2 and latch, whose control input would be controlled by the control signal of an AND gate, the two data inputs of which would be connected to the input 108c1 and 108c2, respectively. The output of the latch would be connected to the terminal 104c1. The switching operation in the AND gate, which would occur in every signal on the bus 106, would have no effects with regard to the security from attacks, since always exactly one change of state occurs between the individual datum and precharge cycles, and thus no conclusions can be drawn about the data content in the data cycles. Consequently, the bridge 400 does not fully prevent any processing, since itself performs one in dependency on the input signals bit and bitq on the bus 106, but it prevents any DPA insecure processing in the subsequent part. Different to an input register, the bridge circuit consequently provides that the content and state, respectively, of the latch at the output and the master stage, respectively, does not change in revealing situations, i.e. in security critical data, while the state of the master stage changes definitely in input registers, but is possibly not passed on to the subsequent slave stage.

After the present invention has been described above in more detail with reference to the figures and with reference to embodiments, it should be noted that the present invention is not limited to the field of cryptocontrollers, but can further also be applied to other security modules, such as TPMs (trusted platform modules). The present invention can, of course, also be applied to applications where no secret data is in danger of being spied out by DPA attacks, such as in microcontrollers or the same, although there the advantages with regard to the increased security are omitted and only the ones with regard to the current saving remain.

Further, it should be noted that the above used definition of security critical data can also be different in other cases. Security critical data can, for example, also be plain text data, which is by themselves already secret, such as assets or the same. Otherwise, an attacker could be able, for example by a DPA attack, to confirm a speculation about the secret data by observing the current consumption.

The seperation of the data does not have to be performed dually into two parts. It is also possible to divide the data in several secrecy stages.

With reference to the above description, it should further be noted that although in FIG. 1 the DPA secure receiver circuit part 104a was directly connected to the bus 106, a processing prevention means could also be connected between bus terminal 108a and receiver circuit part 104a. This leads, however, not to an advantage since the input register 112a as well as the DPA secure logic 110a have to be embodied DPA secure anyway, since the receiver circuit part 104a is provided for performing of operations at security critical data.

In summary, the above embodiments concerned demultiplexing of non security relevant and security relevant data on a multiplexer bus to prevent DPA attacks to subsequent memory and/or logic circuits. The information of the busses were separated prior to their processing. This separation provided for the fact that security critical data arrives in DPA resistant system parts and is processed there, while processing and/or storing of data in non resistant parts is only possible when the same is not security relevant. Functionally, this was obtained by decoupling the memory cell and logic circuit, respectively, via an "isolation layer", wherein as example in FIG. 3, tristate buffers and tristate resistors, respectively, were used.

In the field of security applications, such as money cards or the same, the above embodiments thus solve the problem of DPA susceptibility in an elegant way. For area reasons data path busses are often used for different purposes. In a CPU for example, addresses (security uncritical) and data (security critical) can be transmitted via a common bus. Thereby, there are different receivers for this information. The data could, for example, be processed in a calculating unit and then stored. In the above embodiments of FIGS. 1-3, input memories were considered. The same applies for subsequent logic, which is only interested in the evaluation of uncritical data, as it is the case in FIG. 4. This is performed for area reasons. This, however, enables a DPA attack to the overall system, as is described above, since every datum is written into the memory. Thereby, a significantly different current consumption results when reloading the security critical data. One possible protection measure would be the usage of DPA secure memory units for the input register, but these are area and energy consuming, as it has been described in the background section of the present application.

Thus, the above embodiments represent an elegant solution. If only the security uncritical data is further required, a data correlation in the subsequent memory, i.e. the input register, can be prevented by demultiplexing the different data transmitted over the bus. This enables the usage of small simple memory cells, i.e. 112b, 112c. By using the isolating layer 109b, 109c it is possible to transmit the selected data further over single rail busses (104b1, 104c1) and deposit them in single rail memory cells (112b, 112c). All the statements made herein apply also for uncritical logic parts (FIG. 4).

It has already been mentioned above that the present invention can also be applied to bidirectional busses. In that case it could be provided that the processing prevention means can be controlled by two enable signals, one that enables and prevents, respectively, passing of a signal from the bus to the connected circuit part, and the other that, vice versa, enables and prevents, respectively, passing of a signal from the circuit part connected to the bus to the bus.

Further, it should be noted that above only embodiments have been described where the prevention of processing has been obtained by not passing the signal on the bus to the data input of the respective receiver circuit. Of course, it would also be possible to provide a means as processing prevention means that separates the respective receiver circuit part from a supply voltage, so that the same is deactivated and thus does not contribute to the total current consumption in a way depending on the signal on the bus. Particularly, it would be possible here to separate merely the input stage, namely the input register, from the supply voltage.

With regard to the above-described embodiments it should be noted that the above-described registers, such as the input registers, can also be formed as latches or in another form as temporary storage.

Particularly, it should be noted that depending on the circumstances the inventive scheme for bus and circuit control, respectively, can also be implemented in software. The implementation can be performed on a digital memory medium, particularly a disc or a CD with electronically readable control signals, which can cooperate with a programmable computer system such that the respective method is performed. Generally, the invention consists thus also of a computer program product with program code stored on a machine readable carrier for performing the inventive method, when the computer program product runs on a computer. In other words, the invention can be realized as computer program with a program code for performing the method when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A circuit, comprising:
    a bus;
    a first receiver circuit part coupled to the bus for processing a signal on the bus;
    a second receiver circuit part coupled to the bus for processing a signal on the bus;
    a transmitter circuit part coupled to the bus for outputting a signal on the bus; and
    a unit for preventing processing a signal on the bus by the first receiver circuit part in response to a control signal,
    wherein the unit for preventing is formed to perform the prevention such that the signal on the bus leads to no electrical change of state in the first receiver circuit part.

2. The circuit according to claim 1, wherein the first receiver circuit part comprises a receiver latch with a latch input coupled to the bus.

3. The circuit according to claim 1, wherein the first receiver circuit part comprises a logic with a logic input that is directly connected to the bus.

4. The circuit according to claim 1, wherein the second receiver circuit part comprises a dual rail precharge receiver latch.

5. A circuit according to claim 1, wherein the unit for preventing has an analog multiplexer/demultiplexer.

6. The circuit according to claim 1, wherein the bus is a dual rail precharge bus.

7. A circuit, comprising:
    a bus;
    a first receiver circuit part coupled to the bus for processing a signal on the bus;
    a second receiver circuit part coupled to the bus for processing a signal on the bus;
    a transmitter circuit part coupled to the bus for outputting a signal on the bus; and
    a unit for preventing processing a signal on the bus by the first receiver circuit part in response to a control signal,
    wherein the unit for preventing comprises a unit for preventing the signal from reaching the first receiver circuit part on the bus without the signal leading to a switching operation in the same.

8. A circuit, comprising:
    a bus;
    a first receiver circuit part coupled to the bus for processing a signal on the bus;
    a second receiver circuit part coupled to the bus for processing a signal on the bus;
    a transmitter circuit part coupled to the bus for outputting a signal on the bus; and
    a unit for preventing processing a signal on the bus by the first receiver circuit part in response to a control signal,
    wherein the unit for preventing comprises a unit, which comprises a data input connected to the bus, a data output connected to the first receiver circuit part and a control input for routing current between data input and data output in an absence of the control signal at the control input and for preventing current flow between data input and data output in the presence of the control signal at the control input.

9. The circuit according to claim 8, wherein the unit routes current between the data input and the data output in the absence of the control signal at the control input and prevents current flow between the data input and the data output in the presence of the control signal at the control input such that an otherwise existing electrical continuity between the bus and the first receiver circuit part is interrupted.

10. A circuit, comprising:
    a bus;
    a first receiver circuit part coupled to the bus for processing a signal on the bus;
    a second receiver circuit part coupled to the bus for processing a signal on the bus;
    a transmitter circuit part coupled to the bus for outputting a signal on the bus; and
    a unit for preventing processing a signal on the bus by the first receiver circuit part in response to a control signal,
    wherein the unit for preventing comprises a tristate buffer having a data input, a data output and a control input and being connected between the bus and the first receiver circuit part with data input and data output, respectively, wherein the control input is connected to receive the control signal.

11. A circuit, comprising:
    a bus;
    a first receiver circuit part coupled to the bus for processing a signal on the bus;
    a second receiver circuit part coupled to the bus for processing a signal on the bus;
    a transmitter circuit part coupled to the bus for outputting a signal on the bus; and
    a unit for preventing processing a signal on the bus by the first receiver circuit part in response to a control signal,
    wherein the unit for preventing comprises a unit for decoupling the first receiver circuit part or part of the same from a supply voltage.

12. A circuit, comprising:
    a bus;
    a first receiver circuit part coupled to the bus for processing a signal on the bus;
    a second receiver circuit part coupled to the bus for processing a signal on the bus;
    a transmitter circuit part coupled to the bus for outputting a signal on the bus;
    a unit for preventing processing a signal on the bus by the first receiver circuit part in response to a control signal,
    wherein the receiver latch of the first receiver circuit part has a register output and a latch control input for latching the signal on the bus and outputting the same at the latch output in response to an activation signal at the latch control input; and
    a bus control for sending the activation signal to the latch control input of the receiver latch of the first receiver circuit part and not sending the control signal to the unit for preventing, if the receiver circuit part is an addressee of the signal on the bus, and for sending the control signal to the unit for preventing if the first receiver circuit part is not the addressee of the signal on the bus.

13. The circuit according to claim 12, wherein the bus control is formed to send the control signal in a case that the first receiver circuit part is not the addressee of the signal on the bus only when a signal on the bus concerns a secret, and in a case that the signal on the bus does not concern a secret to not send the activation signal to the receiver latch of the first receiver circuit part and to not send the control signal to the unit for preventing.

14. A circuit, comprising:
    a bus;
    a first receiver circuit part coupled to the bus for processing a signal on the bus;

a second receiver circuit part coupled to the bus for processing a signal on the bus;

a transmitter circuit part coupled to the bus for outputting a signal on the bus;

a unit for preventing processing a signal on the bus by the first receiver circuit part in response to a control signal;

wherein the second receiver circuit part comprises a receiver latch, comprising a latch input coupled to the bus, a latch output and a latch control input for latching the signal on the bus and outputting the same at the latch output in response to an activation signal at the latch control input; and a bus control for sending the activation signal to the latch control input of the receiver latch of the second receiver circuit part, if the second receiver circuit part is an addressee of the signal on the bus.

15. A circuit, comprising:

a bus;

a first receiver circuit part coupled to the bus for processing a signal on the bus;

a second receiver circuit part coupled to the bus for processing a signal on the bus;

a transmitter circuit part coupled to the bus for outputting a signal on the bus; and a unit for preventing processing a signal on the bus by the first receiver circuit part in response to a control signal, wherein the second receiver circuit part is implemented more DPA secure than the first receiver circuit part.

16. A circuit, comprising:

a bus;

a first receiver circuit part coupled to the bus for processing a signal on the bus;

a second receiver circuit part coupled to the bus for processing a signal on the bus;

a transmitter circuit part coupled to the bus for outputting a signal on the bus; and a unit for preventing processing a signal on the bus by the first receiver circuit part in response to a control signal, wherein the first and the second receiver circuit parts are connected to the bus such that in a case of no prevention they receive the signal on the bus without latching.

* * * * *

UNITED STATES PATENT AND TRADEMARK OFFICE
CERTIFICATE OF CORRECTION

PATENT NO. : 7,240,134 B2  
APPLICATION NO. : 10/958182  
DATED : July 3, 2007  
INVENTOR(S) : Franz Klug et al.

Page 1 of 1

It is certified that error appears in the above-identified patent and that said Letters Patent is hereby corrected as shown below:

In the Specification:

At column 2: line 16, "change" should read --changes-- line 66, "fist" should read --first--

At column 3: line 41, "non" should read --more--

At column 5: lines 20-21, there should not be a new paragraph

At column 7: line 11, "is" should read --has--

At column 8: line 67, "them" should read --to them--

At column 11: line 12, "receiver" should read --received--

At column 12: line 29, "allows to carry out the" should read --permits--

At column 14: line 35, "as processing" should read --of processing-- line 59, "as computer" should read --as a computer--

Signed and Sealed this

Eighteenth Day of September, 2007

JON W. DUDAS  
*Director of the United States Patent and Trademark Office*